Nov. 12, 1963  K. SCHLICHTING ETAL  3,110,509
HITCH DEVICE
Filed May 13, 1960
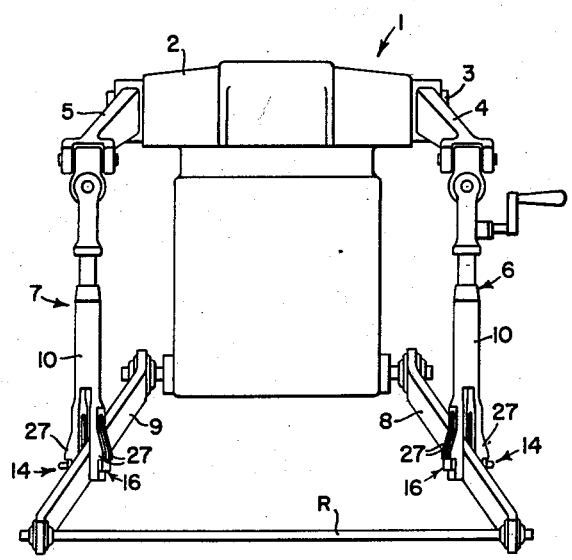
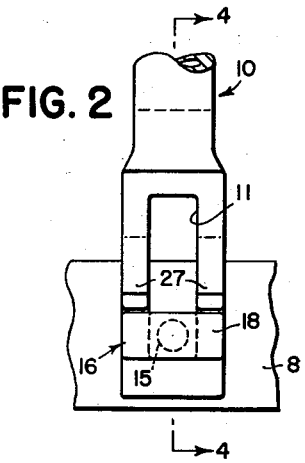
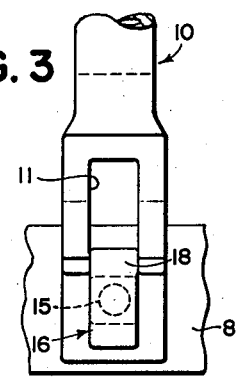
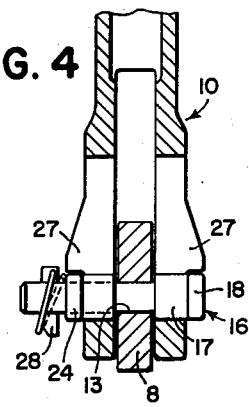
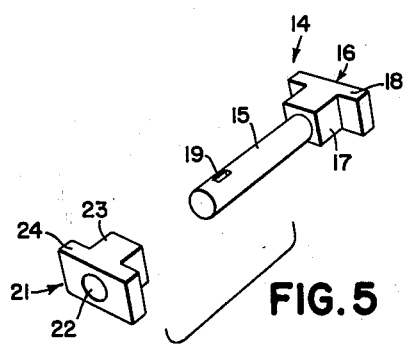
INVENTORS.
KURT SCHLICHTING
HANS MÜLLER
ATTORNEYS United States Patent Office 3,110,509
Patented Nov. 12, 1963

3,110,509
HITCH DEVICE
Kurt Schlichting, Bruhl, Baden, and Hans Müller, Mannheim, Germany, assignors to Deere & Company, Moline, Ill., a corporation of Delaware
Filed May 13, 1960, Ser. No. 28,911
Claims priority, application Germany May 30, 1959
5 Claims. (Cl. 287—3)

The present invention relates generally to agricultural implements and more particularly to hitch devices for connecting an agricultural implement with a tractor.

The object and general nature of this invention is the provision of new and improved hitch means of the three-point hitch type, wherein means is provided for optionally connecting the implement to have relative movement with respect to the tractor permitting the implement to rock about a generally fore-and-aft extending axis or to have such relative movement locked out.

Specifically, it is a feature of this invention to provide connections between the power lift arms of the tractor and the draft links, the draft links serving as means by which draft forces are transmitted between the implement and the tractor, such connections including means in the nature of a pin and slot connection whereby the implement may tilt laterally with respect to the tractor, such implements generally being of the type in which the implement has its own supporting wheels or is relatively wide so that for best operation the implement is required to follow the ground surface, rather than be gauged entirely from the tractor. It is a further object of this invention to provide means for easily and conveniently eliminating the aforesaid pin and slot connection, at least to the extent that relative lateral swinging of the implemen relative to the tractor is prevented whereby the implement will be gauged entirely from the tractor.

Further, it is an important feature of this invention to provide the lift links with the generally vertically extending slots in which pivot members, connected with the draft links, are free to move when it is desired to have the implement connected with the tractor so as to adapt itself to the surface of the ground independently of the position of the tractor, and it is a further feature of this invention to provide abutment members rotated about each pivot member and adapted to be disposed in a position to prevent any movement of the pivot members in the associated slots whenever it is desired to have the implement supported entirely by the tractor.

These and other objects and advantages of this invention will be apparent to those skilled in the art after a consideration of the accompanying drawings, in which:

FIG. 1 is a fragmentary rear view showing a hydraulically operable three-point tractor-implement hitch in which the principles of the present invention have been incorporated, the upper thrust link being omitted for simplification.

FIG. 2 is an enlarged side view of the structure incorporating this invention, wherein relative movement between the draft link and the associated lift link is locked out.

FIG. 3 is a view similar to FIG. 2, showing the arrangement of the parts whereby the draft link may move vertically relative to the associated lift link.

FIG. 4 is a section taken along the line 4—4 of FIG. 2.

FIG. 5 is a fragmentary perspective view showing the pivot member and lock out means associated therewith.

Referring first to FIG. 1, the numeral 1 denotes the rear end of the body of a tractor on which is fastened or carried a rockshaft housing 2 in which a transverse rockshaft housing 2 in which a transverse rockshaft 3 is disposed, the rockshaft 3 being connected with well known hydraulic means whereby the rockshaft may be rocked by hydraulic power under the control of the operator of the tractor. Lift arms 4 and 5 are fixed, respectively, to the ends of the rockshaft 3, and lift links 6 and 7 are pivotally and swingably connected at the upper ends with the rear ends of the lift arms 4 and 5. The lower ends of the lift links 6 and 7 are connected with the draft links 8 and 9 of the tractor by means that incorporates the principles of this invention. The rear ends of the draft links 8 and 9 are connected with the associated implement, as by cross rod R or other means, the forward ends of the draft links 8 and 9 being connected with the lower portion of the tractor by ball joint means, which is conventional for this type of implement hitch means.

According to this invention, each of the lift links 6 and 7 includes a lower bifurcated section 10 rotatably associated with the upper lift link section. Each lower bifurcated section 10 is formed with a generally vertical slot cated section 10 is formed with a generally vertical slot 11 between which the associated draft link 8 or 9 is disposed. The portion of each draft link lying in the slot 11 is apertured, as at 13 (FIG. 4), to receive a transverse pivot member 14. The latter is of particular construction. As best shown in FIG. 5, each pivot member 14 includes the shank or pin section 15 formed with or having an abutment section in the form of a hammer-like head 16 that provides a generally square portion 17 and a generally rectangular portion 18. The section 16 may be formed integral with the pin 14, or the section 16 may be formed separately from the pivot pin 14 and securely fixed thereto in a suitable way. The end of the pivot member 14 opposite the head 16 is slotted, as at 19. The pivot means 14 also includes a second abutment section 21 that is substantially identical in shape and dimension as the head 16 just described. The section 21 is apertured, as at 22, and is freely disposable on and removable from the apertured end portion of the pivot 14. The section 21 also includes a square portion 23 and a rectangular portion 24.

Each side of the slotted portion 10 of the lift link is provided with a pair of laterally outwardly extending shoulders 27 forming downwardly facing abutment means, the shouldered portion 27 lying at opposite sides of the associated slot 11. As will best be seen from FIGS. 2–4, the portion 21 is held in place on the pivot member 14 by a removable spring pin 28 of conventional construction.

When it is desired to prevent the implement from floating generally vertically relative to the tractor or tilting relative thereto in a lateral transverse generally vertical plane, as may be desirable or necessary when the implement is to be gauged entirely by and supported on the tractor independently of the ground, the pivot member 14 is arranged as shown in FIGS. 2 and 4, with the shank 15 of the pin 14 extending through the opening 13 in the associated draft link and with the rectangular portions 18 and 24 turned so as to underlie the shoulders 27. To arrange the pivot means in this way, it may be first necessary to take out the pin 28, or at least partially remove the shank 15 from the detachable abutment member 21 so that the rectangular section 18 may be disposed underneath the associated shoulders 27, after which the detachable abutment means 21 is turned transversely and passed over the shank 15 so that the transverse or rectangular section 24 will be disposed underneath the shoulders 27 at the other side of the lift link, after which the pin 28 may then be reinserted in the opening 19 to lock the parts in the position shown in FIGS. 2 and 4. When arranged in this way, it will be seen that the rectangular sections 18 and 24 effectively prevent the pivot means 14 from moving vertically in the associated slot 11, thus preventing any floating action of the implement relative to the tractor.

When the aforesaid floating action is desired, however, as when the implement is relatively wide and is required to follow the surface of the ground independently of the tractor, the member 28 is removed from each pivot means and the abutment sections 18 and 24 turned to the position indicated in FIG. 3, in which the rectangular sections 18 and 24 are free to slide generally vertically within the slots 11, moving between the shouldered portions 27. Thus, the implement is now free to follow the ground surface independently of the position of the tractor and the engagement of the rectangular sections 18 and 24 with the inner faces of the flanges 27 prevents the pivot members from turning out of position.

While we have shown and described above the preferred structure in which the principles of the present invention have been incorporated, it is to be understood that our invention is not to be limited to the particular structure shown and described above, but that, in fact, widely different means may be employed in the practice of the broader aspects of our invention.

What we claim, therefore, and desire to secure by Letters Patent is:

1. In a hitch device for agricultural implements and the like, a generally horizontal draft link having a transverse aperture therethrough, a generally vertical lift link having a lower bifurcated end portion adapted to straddle the apertured portion of said draft link, the bifurcated portion being slotted and the slots in the lift link being disposed transversely of the draft link, a pivot connecting the lift link with the draft link and disposed in said draft link opening and in said slots, locking blocks carried by said pivot and disposable in said slots optionally in either of two positions, one position being that in which said blocks are slidable in said slots, whereby said links are adapted to move one relative to the other through a limited distance, and means on the bifurcated portion of the draft link engageable with said blocks to hold the latter against movement in said slots.

2. In a hitch device for agricultural implements and the like, a generally horizontal draft link having a transverse aperture therethrough, a generally vertical lift link having a lower bifurcated end portion adapted to straddle the apertured portion of said draft link, the bifurcated portion being slotted and the slots in the lift link being disposed transversely of the draft link, a pivot connecting the lift link with the draft link and disposed in said draft link opening and in said slots, lock means carried by said pivot and shiftable thereon between a first position lying wholly in said slots and a second position extending transversely of said slots, and means on said lift link engageable with said lock means in said second position to prevent relative movement between said links.

3. An apparatus comprising a generally horizontally disposed member having a transverse aperture therein, a generally vertically disposed member having a bifurcated lower portion, a generally vertically extending slot within each of said bifurcated portions, pivot means having a central portion disposed within said aperture and having rectangular end portions slidable within said slots when said end portions are generally vertically disposed, and outwardly extending abutment means on said bifurcations adapted to engage said rectangular end portions when said end portions are horizontally disposed to limit sliding movement.

4. In a connection between a draft link and an associated lift link, there being an aperture through one of said links and a longitudinal slot in the other link adapted to register with said aperture, a pivot member extending through said aperture, abutment shoulders carried by said other link at opposite sides of said slot, and abutment members on each end of said pivot member and disposable optionally in a first position engaging said abutment shoulders to prevent movement of said pivot member in said slot and in a second position lying within said slot and accommodating relative movement of said pivot member in said slot, one of said abutment members being fixed to the pivot member and the other abutment member being removable from the pivot member.

5. The invention set forth in claim 4, further characterized by said abutment members being turnable between a position transversely of said slot and a position aligned with said slot.

References Cited in the file of this patent
UNITED STATES PATENTS

| | | |
|---|---|---|
| 1,030,527 | Nelson | June 25, 1912 |
| 2,541,964 | Hennings | Feb. 13, 1951 |
| 2,920,500 | Edman | Jan. 12, 1960 |

OTHER REFERENCES

German printed application of Hermann Schwarz, Serial No. Sch. 16140 VI/5c, printed June 28, 1956 (Kl. 5C 11) (4 pages spec., 3 sheets dwg.).